(12) United States Patent
Besuchet

(10) Patent No.: US 11,841,687 B2
(45) Date of Patent: Dec. 12, 2023

(54) ELECTROMECHANICAL WATCH

(71) Applicant: ETA SA Manufacture Horlogère Suisse, Grenchen (CH)

(72) Inventor: Romain Besuchet, Yverdon-les-Bains (CH)

(73) Assignee: ETA SA MANUFACTURE HORLOGÈRE SUISSE, Grenchen (CH)

(*) Notice: Subject to any disclaimer, the term of this patent is extended or adjusted under 35 U.S.C. 154(b) by 475 days.

(21) Appl. No.: 16/933,091

(22) Filed: Jul. 20, 2020

(65) Prior Publication Data

US 2021/0048783 A1 Feb. 18, 2021

(30) Foreign Application Priority Data

Aug. 15, 2019 (EP) .................................... 19191930

(51) Int. Cl.
*H02P 3/22* (2006.01)
*H02P 7/18* (2006.01)
*G04C 3/14* (2006.01)
*G04C 3/00* (2006.01)

(52) U.S. Cl.
CPC ............. *G04C 3/143* (2013.01); *G04C 3/004* (2013.01)

(58) Field of Classification Search
CPC .................................. H02P 6/181; H02P 9/48
See application file for complete search history.

(56) References Cited

U.S. PATENT DOCUMENTS

| | | | |
|---|---|---|---|
| 4,382,693 A | | 5/1983 | Tu Xuan |
| 4,633,156 A | * | 12/1986 | Besson .................... G04C 3/14 |
| | | | 318/696 |
| 2015/0085625 A1 | | 3/2015 | Saito et al. |
| 2017/0357216 A1 | * | 12/2017 | Fukushima .............. H02P 8/02 |

FOREIGN PATENT DOCUMENTS

| | | |
|---|---|---|
| CN | 1164142 A | 11/1997 |
| CN | 104467348 A | 3/2015 |
| CN | 107872138 A | 4/2018 |
| EP | 0026002 A1 | 4/1981 |
| JP | 61-180599 A | 8/1986 |

OTHER PUBLICATIONS

Office Action dated Jun. 15, 2021 in Chinese Application No. 202010812040.1.
Search Report of EP19191930.7 dated Feb. 19, 2020.

* cited by examiner

*Primary Examiner* — Bickey Dhakal
*Assistant Examiner* — Charles S Laughlin
(74) *Attorney, Agent, or Firm* — Sughrue Mion, PLLC

(57) ABSTRACT

An electromechanical watch including an electromechanical motor (4) mechanically coupled to an analogue display (AD) and formed by two coils (B1, B2) through which the magnetic circuit (10) of the stator passes. A first of the two coils is connected to a voltage detection circuit (CD1, CD2) arranged to be able to detect any voltage induced in this first coil during intervals of time occurring, in a stepping functioning mode of the motor, between drive pulses to detect whether an unwanted step is made by the rotor (18) during these intervals of time. The electromechanical watch includes at least one switch (T1, T2, T3) that is controlled by an electronic control circuit (CEC) to short-circuit the second coil during each of said intervals of time, in order to passively hold the rotor in the idle position in which it is situated momentarily between the drive pulses.

3 Claims, 2 Drawing Sheets

Fig. 2

| S1 | S2 | S3 | T1 | T2 | T3 | B1 | B2 |
|---|---|---|---|---|---|---|---|
| '1' | '0' | '0' | F | O | O | in series ||
| '1' | '1' | '0' | F | F | O | Short-circuit | Detect shocks |
| '1' | '0' | '1' | F | O | F | Detect shocks | Short-circuit |
| '0' | '1' | '1' | O | F | F | in parallel ||

ELECTROMECHANICAL WATCH

CROSS-REFERENCE TO RELATED APPLICATION(S)

This application claims the benefit based on Patent Application No. EP19191930.7 filed Aug. 15, 2019, the contents of all of which are incorporated herein by reference in their entirety.

TECHNICAL FIELD

The present invention relates to electromechanical watches that comprise an analogue display and are liable to undergo, in the event of shocks, unwanted shifts of this analogue display. In particular, the present invention relates to a system for making such electromechanical watches more robust in the event of shocks while making it possible to detect unwanted steps, that is to say uncovenanted steps.

TECHNOLOGICAL BACKGROUND

The problem of the risk of unwanted steps in the event of shocks for electromechanical watches has been known for a long time, and various solutions have been provided for this problem.

The document EP 1 693 720 proposes a system wherein provision is made for detecting an impact suffered by an electromechanical watch by means of an impact detection unit that is connected to the ends of the single coil of the stepping motor during the intervals of time between the drive pulses supplied to the motor. This is because, when a hand moves during a shock, the movement of the permanent-magnet rotor that results therefrom generates an electrical signal in the coil, which can be detected by the impact detection unit. Following the detection of an unwanted movement of the rotor via the electrical signal generated in the coil, provision is made for sending an electrical pulse blocking the rotor so as to prevent the stepping motor making one or more unwanted steps. This solution has several drawbacks. Firstly, connecting the coil to a circuit for detecting an electrical signal induced in the coil by a movement of the rotor requires keeping very high impedance for the coil, in which no current can consequently flow. Thus this solution does not make it possible to benefit from a damping of an unwanted movement of the rotor by means of a current caused by such a movement during the intervals of time occurring between the drive pulses. In this state, the electromechanical motor is therefore vulnerable to shocks or other abrupt accelerations that the watch may suffer, even if it can then detect such events when the latter cause unwanted movements of the analogue display and therefore of the rotor that is mechanically connected to this analogue display. Secondly, the system makes provision for detecting whether the watch undergoes a shock and next reacting to this information by generating a pulse blocking the rotor. Thus it is possible for the reaction to be too late and/or insufficient to prevent the motor making at least one unwanted step. In addition, if the blocking pulse does not manage to prevent an unwanted step, this blocking pulse then in its turn causes a second unwanted step. Finally, generating blocking pulses may consume a great deal of electrical energy. If the detection threshold is set relatively low in order to ensure rapid detection and reaction as quickly as possible, blocking pulses are then generated often so that the battery life of the electromechanical watch is reduced.

The document EP 3 171 231 also describes a system of the type proposed in the document cited above. Provision is made here for a shock detection circuit that is connected to at least one electrical terminal of the electromechanical motor so as to be able to detect a voltage induced in the single coil of the stepping motor in the event of shocks suffered by the watch that cause an unwanted movement of the analogue display, that is to say of at least one indicator kinematically connected to the stepping motor. Provision is also made here for generating a blocking pulse following the detection of a shock. This implementation raises the same problems as those described in relation to the previously mentioned document. It should also be noted that a shock detection circuit may also be arranged to detect whether a required step has not taken place, so as then to be able to generate a takeup step.

It should be noted that a device making it possible to count unwanted steps of the stepping motor and the direction of rotation of the rotor during such unwanted steps has been proposed. Following a shock that has caused one or more unwanted steps of the rotor, it is possible to correct the error caused in the analogue display in an appropriate manner, either by correction steps or, when the direction of the unwanted steps is that provided for driving the analogue display, by inhibiting a number of drive pulses corresponding to the number of unwanted steps via the control of the motor that periodically generates drive pulses for driving the analogue display. With such a solution, it is no longer necessary to electrically block the rotor by means of an electrical signal when a shock is detected and therefore to provide a sufficiently rapid and strong reaction of the electronic circuit of the watch. This solution has the advantage of not limiting the unbalanced mass that may be presented by an indicator forming the analogue display. However, these means for counting unwanted steps via the detection of an electrical signal induced in the coil of the motor prevents the stepping motor being able, in a "natural" manner, to passively oppose such unwanted steps in the event of shocks; which increases the electrical consumption of the electromechanical watch.

The patent application CH 0026002 discloses a single-phase stepping motor provided with two coils. According to the teaching of this document, the two coils are arranged in series so as to generate strong pulses enabling the rotor to turn in a first direction, referred to as the preferential direction, and in parallel to generate pulses enabling the rotor to then turn in the direction opposite to the preferential direction. Between the pulses serving to drive the rotor in one direction or the other, provision is made for putting the two coils in short-circuit in order to brake the rotor and thus limit the number of unwanted steps in the event of shock. No circuit for detecting shocks or unwanted steps and no circuit for correcting such unwanted steps are provided. According to the situation and the drive mode provided, an unwanted step is "naturally followed" by a correction step or two other steps in the wrong direction, which may thus leave an error of three steps following a shock.

SUMMARY OF THE INVENTION

The aim of the present invention is to remedy the aforementioned technical problems.

To this end, the invention relates to an electromechanical watch the electromechanical motor of which is formed by a stator, comprising a magnetic circuit and a first coil through which this magnetic circuit passes, and by a rotor provided with a permanent magnet coupled to the magnetic circuit, this magnetic circuit defining at least one minimum energy position for the rotor, which is mechanically coupled to the analogue display of the watch. The first coil is arranged so as to be able, in a stepping functioning mode of the electromechanical motor, to be connected to a voltage detection circuit that is arranged to detect any voltage induced in this first coil during intervals of time occurring between the drive pulses supplied to the motor and in particular to detect whether an uncovenanted step is performed by the rotor during these intervals of time. Next the electromechanical motor comprises a second coil through which the magnetic circuit passes. In addition, the electromechanical watch comprises at least one switch that is controlled by the electronic control circuit, in the stepping functioning mode of the electromechanical motor, so as to connect the first coil to the voltage detection circuit during intervals of time among said intervals of time and to short-circuit the second coil during at least the major part of each of these intervals of time.

In a first main variant, the electromechanical watch is arranged so that the first coil is connected to the voltage detection circuit during all said intervals of time, and so that the second coil is short-circuited during at least the major part of each of said intervals of time.

In a second main variant, the detection circuit and a set of switches are arranged so that each of the first and second coils can be connected to at least part of the voltage detection circuit. Next, the set of switches is arranged and controlled by the electronic control circuit so that, during each of said intervals of time, either one of the first and second coils is connected to the voltage detection circuit and the other one of these first and second coils is short-circuited during at least the major part of this interval of time.

By virtue of the features of the electromechanical watch according to the invention, detection of any unwanted steps of the motor during a shock is preserved via at least one of the first and second coils connected to the voltage detection circuit, and in addition the rotor is passively blocked via the other one of these two coils, which is short-circuited outside the drive pulses. Thus the number of any unwanted steps is greatly reduced in the event of shock and, if an unwanted step were nevertheless to take place at the time of a shock, detection thereof remains assured; which makes it possible firstly to next correct the error caused for the analogue display and secondly to if necessary further increase the resistance of the motor to the shock by generating a blocking pulse via one of the two coils.

BRIEF DESCRIPTION OF THE FIGURES

The invention will be described below in more detail by means of the accompanying drawings, given by way of in no way limitative examples, wherein:

FIG. 2 is a table giving various states of a circuit with three switches and the resulting configurations for the two coils forming the stator of the electromechanical motor of the watch in FIG. 1.

DETAILED DESCRIPTION OF THE INVENTION

Figure 1:
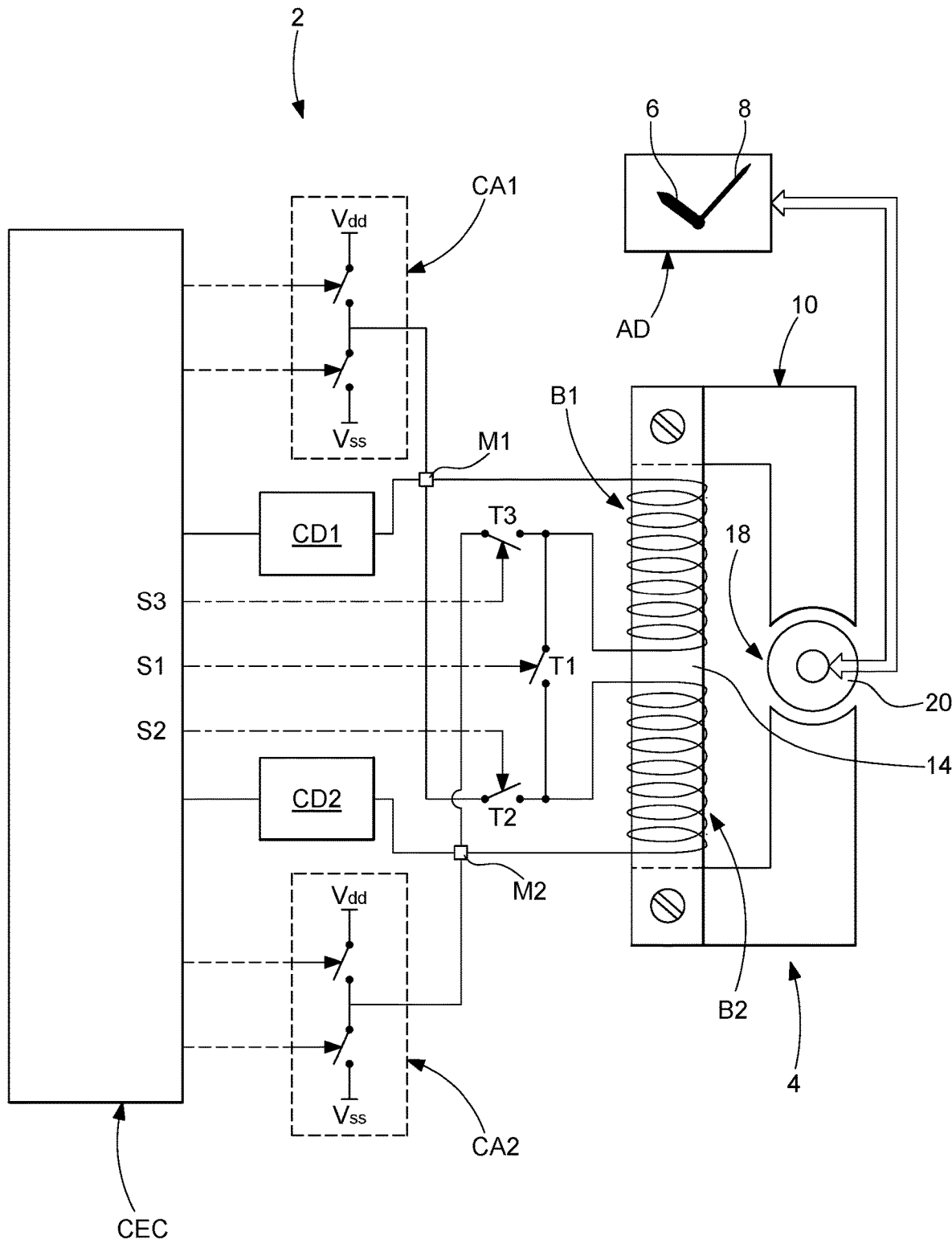
FIG. 1 depicts schematically an embodiment of an electromechanical watch according to the invention.

With reference to FIGS. 1 and 2, an embodiment of an electromechanical watch 2 according to the invention will be described hereinafter.

The electromechanical watch 2 comprises:
an analogue display AD comprising in particular an hour hand 6 and a minute hand 8,
an electromechanical motor 4 formed by a stator, comprising a magnetic circuit 10 and a coil B1 through which a core 14 forming the magnetic circuit passes, and by a rotor 18 provided with a permanent magnet 20 magnetically coupled to the magnetic circuit, this rotor being mechanically coupled to the analogue display,
a power supply circuit, depicted in two parts CA1 and CA2, to supply the electromechanical motor, the two parts of the supply circuit being connected respectively to a first electrical terminal M1 and a second electrical terminal M2 of the electromechanical motor,
an electronic circuit for controlling the electromechanical motor, this electronic control circuit CEC being arranged so that, in a stepping functioning mode of the electromechanical motor, the supply circuit generates, on command, drive pulses having between them nonzero intervals of time, and
a voltage detection circuit having, in the variant depicted, two parts CD1 and CD2 connected respectively to the first and second electrical terminals M1 and M2, this detection circuit being arranged to be able to detect a voltage induced in the coil B1 during said intervals of time and in particular to detect, on the basis of this induced voltage, whether an unwanted step is performed by the rotor 18 during these intervals of time.

The electromechanical motor 4 is of the stepping type, the magnetic circuit 10 defining for the rotor 18 at least one minimum energy position towards which the rotor, when it is in movement, turns in the absence of an electrical supply and in which it remains in the absence of an electrical supply, that is to say in the absence of drive pulses supplied on command by the power supply circuit. Each minimum energy position defines a stable position for the rotor in the absence of an electrical supply, also referred to as the "idle position". Thus it is possible to detect, via the voltage induced in the coil B1, during the intervals of time between the drive pulses, whether the rotor is turning from an idle position in which it is momentarily situated.

Several documents of the prior art, in particular those cited in the technological background, describe various embodiments for the circuit for detecting an electrical signal induced in a coil of the stepping motor of an electromechanical watch and for processing the induced electrical signal detected with a view to determining whether at least one unwanted step, that is to say uncovenanted, has taken place between two drive pulses intended to operate the stepping motor. These documents of the prior art also describe, as indicated previously, various possible reactions for preventing an unwanted step being performed as soon as an uncovenanted rotation is detected and/or to count unwanted steps and the corresponding direction of rotation so as then to correct the error resulting therefrom for the analogue display. These various embodiments and possible reactions can be implemented in the circuits CA1 and CA2 for detecting a voltage induced in a coil and in the electronic control circuit CEC. It should be noted that, in a variant, only one of the two electrical terminals M1, M2 is connected to the circuit for detecting an induced voltage, which then comprises a single part CD1 or CD2.

According to the invention, the stator of the electromechanical motor further comprises a coil B2 through which the magnetic circuit 10 passes, in particular the core 14 as depicted in FIG. 1. Next, in general terms, the electromechanical watch 2 comprises at least one switch that is controlled by the electronic control circuit CEC so as to short-circuit the coil B2 during at least the major part of each of said intervals of time in a stepping functioning mode of the electromechanical motor 4. It should be noted that, in another configuration of the electromechanical motor, the coil B2 may have a second core of the magnetic circuit pass through it. As the permanent magnet of the rotor is magnetically coupled to the magnetic circuit, this permanent magnet is magnetically coupled to the two coils B1 and B2 by the respective two cores.

In the preferred embodiment described with reference to the figures, the electromechanical watch comprises a plurality of switches T1, T2 and T3 that are arranged and controlled by the electronic control circuit CEC so that the coil B1 and the coil B2 can be arranged, during the drive pulses, either in series or in parallel. In addition, during said intervals of time between the drive pulses, it is possible to either short-circuit the coil B2 and to detect the voltage in the coil B1, or to short-circuit the coil B1 and detect the voltage in the coil B2. The table given in FIG. 2 supplies, for various useful states of the three switches T1, T2 and T3, controlled respectively by three digital signals S1, S2 and S3 generated by the electronic control circuit CEC, the corresponding configurations of the coils B1 and B2. Thus the coil connected during said intervals of time to the voltage detection circuit is either the coil B1 or the coil B2, and the coil short-circuited during these intervals of time is respectively either the coil B2 or the coil B1. A closed switch (denoted "F") is conducting whereas an open switch (denoted "O") is non-conducting.

In an aforementioned variant, only one of the two coils may be connected to a detection circuit CD, formed by one or other of the two parts CD1 and CD2 of such a detection circuit depicted in FIG. 1. In this variant, during at least the major part of the intervals of time between the drive pulses, the coil that can be connected to a detection circuit CD is connected to this coil and the other coil is put in short-circuit in order to brake any uncovenanted movement of the rotor during at least the major part of said intervals of time, and thus prevent unwanted steps or limit the number thereof.

The configuration of the coils B1 and B2 in series is preferably used when drive pulses are applied to the electromechanical motor in a normal stepping functioning mode, this configuration in series making it possible to minimise the electrical energy consumed. The configuration of the coils B1 and B2 in parallel is preferably used when drive pulses are applied to the electromechanical motor in an accelerated functioning mode, that is to say at relative high speed, in particular when adjusting the time or during an operation of correcting the analogue display AD. It should be noted that it is also possible to make provision, if required, for supplying only one of the two coils during certain drive pulses supplied to the electromechanical motor.

The invention claimed is:

1. An electromechanical watch comprising:
an analogue display,
an electromechanical motor formed by a stator, comprising a magnetic circuit and a coil through which this magnetic circuit passes, and by a rotor provided with a permanent magnet coupled to the magnetic circuit, this magnetic circuit defining at least one minimum energy position for the rotor, this rotor being mechanically coupled to the analogue display,
a power supply circuit for supplying the electromechanical motor, this power supply circuit being connected to a first electrical terminal and a second electrical terminal of the electromechanical motor,
an electronic circuit for controlling the electromechanical motor, this electronic control circuit being arranged so that, in a stepping functioning mode of the electromechanical motor, the power supply circuit generates, on command, drive pulses having between them non-zero intervals of time, and
a voltage detection circuit arranged so as to be able to detect a voltage induced in said coil during said intervals of time and in particular to detect, on the basis of this induced voltage, whether a step is made by the rotor during these intervals of time;
wherein said coil is a first coil and the stator of the electromechanical motor further comprises a second coil (B2) through which said magnetic circuit passes; wherein the electromechanical watch comprises at least one switch that is controlled by the electronic control circuit, in the stepping functioning mode of the electromechanical motor, so as to connect the first coil to said voltage detection circuit during intervals of time among said intervals of time and to short-circuit the second coil during at least a major part of each of these intervals of time, and
wherein the at least one switch is further controlled by the electronic control circuits so as to short-circuit the second coil without short-circuiting the first coil.

2. The electromechanical watch according to claim 1, wherein the electromechanical watch is arranged so that the first coil is connected to said voltage detection circuit during all said intervals of time, and so that the second coil is short-circuited during at least a major part of each of said intervals of time.

3. The electromechanical watch according to claim 2, wherein the electromechanical watch comprises a plurality of switches arranged and controlled by the electronic control circuit so that the first and second coils can be arranged either in series or in parallel during the drive pulses.

* * * * *